United States Patent
Okazaki et al.

[11] Patent Number: 6,133,545
[45] Date of Patent: Oct. 17, 2000

[54] WELDING ROBOT

[75] Inventors: Yoshiyuki Okazaki; Satoru Komatsu; Masaya Hirayama, all of Osaka; Teruhiko Hinata, Kanagawa, all of Japan

[73] Assignee: Matsushita Electric Industrial Co., Ltd., Osaka, Japan

[21] Appl. No.: 09/320,418

[22] Filed: May 26, 1999

[30] Foreign Application Priority Data

May 27, 1998 [JP] Japan .................................. 10-145359

[51] Int. Cl.⁷ ................................................ B23K 9/095
[52] U.S. Cl. ............................ 219/124.34; 219/130.01; 219/130.5
[58] Field of Search ........................... 219/130.5, 130.01, 219/132, 125.1, 124.34; 901/42; 702/35, 184

[56] References Cited

U.S. PATENT DOCUMENTS

| | | | |
|---|---|---|---|
| 4,445,022 | 4/1984 | Mori | 219/130.5 |
| 5,353,238 | 10/1994 | Neef et al. | 702/184 |
| 5,812,408 | 9/1998 | Karakama et al. | 702/35 |
| 5,932,123 | 8/1999 | Marhofer et al. | 219/130.01 |

*Primary Examiner*—Clifford C. Shaw
*Attorney, Agent, or Firm*—Pearne & Gordon LLP

[57] ABSTRACT

A measured welding event is reproduced by a welding robot. Welding events are organized into a database by a three-dimensional measuring device and a data logging device, and the welding events are subjected to statistical and analytical processes, thereby producing operation data of a robot.

9 Claims, 3 Drawing Sheets

WELDING ROBOT

BACKGROUND OF THE INVENTION

1. Field of the Invention

The present invention relates to a welding robot which can reproduce a welding operation conducted by a person.

2. Description of the Related Art

Conventionally, operation data of a welding robot are prepared by using a dedicated teaching device or an off-line system. Namely, such data are prepared in an environment which is completely independent from manual welding.

Conditions of conducting a welding operation are accumulated in the form of personal know-how.

In the conventional method described above, it is very difficult for a person skilled in welding to conduct a welding work with using an inexperienced welding robot. Even when a welding robot is introduced, therefore, a person must be trained to be a dedicated operator.

Furthermore, since welding conditions are mainly determined on intuition of the operator, it is difficult to transmit know-hows of a person skilled in welding to the next generation.

SUMMARY OF THE INVENTION

It is an object of the invention to enable a person who cannot prepare operation data by directly operating a welding robot, to prepare operation data of the welding robot by conducting a welding operation.

It is another object of the invention to allow know-hows of a person skilled in welding which are personally managed, to be organized into a database, thereby transmitting welding techniques in the form of a digital data to the next generation.

In order to attain the object, according to a first aspect of the invention, there is provided a welding robot comprising: a welding operation database in which at least a welding current or a welding voltage is accumulated as welding conditions; robot operation generating means for receiving welding conditions corresponding to objective welding from the welding operation database, and for deciding an operation of the robot; a robot controller which drivingly controls the robot in accordance with an output of the robot operation generating means; and a welder which is controlled in accordance with the welding conditions output from the welding operation database.

According to a second aspect of the invention, information from welding torch path collecting means is accumulated together with at least the welding current or the welding voltage in the welding operation database as welding conditions.

According to a third aspect of the invention, welding image information from image capturing means is accumulated together with at least the welding current or the welding voltage in the welding operation database as welding conditions.

According to a fourth aspect of the invention, welding video information from video capturing means is accumulated together with at least the welding current or the welding voltage in the welding operation database as welding conditions.

According to a fifth aspect of the invention, at least the welding current or the welding voltage is accumulated via a data logging device in the welding operation database as welding conditions.

According to a sixth aspect of the invention, the robot further comprises analytical and statistical processing means for linking the welding operation database with data.

According to a seventh aspect of the invention, the robot further comprises: three-dimensional displaying means for choosing plural welding conditions corresponding to objective welding from the welding operation database, and for displaying a welding state corresponding to the chosen welding conditions; and selecting means for selecting the chosen welding conditions.

According to an eighth aspect of the invention, the robot further comprises: collecting means for collecting at least the welding current or the welding voltage as welding conditions during playback; and comparing means for comparing the collected welding conditions with the welding conditions which are selected from the welding operation database.

DETAILED DESCRIPTION OF THE PREFERRED EMBODIMENTS

According to the invention configured as described above, a welding operation which is conducted by a person can be registered in the welding operation database in the form of digital information, and hence operation data of the welding robot can be prepared on the basis of information of the welding operation database. In the preparation of operation data of the welding robot, information of the welding operation database can be processed by statistical and analytical processes, and hence optimum operation data for the welding robot can be prepared.

Since the three-dimensional displaying means is used, information accumulated in the welding operation database can be displayed and checked in a visual and three-dimensional manner.

Since an image and a video can be accumulated together with welding conditions in the welding operation database, the manner of a welding operation, the state of a workpiece, and a result of the welding operation can be displayed and checked in a visual manner.

Since the three-dimensional display using the three-dimensional displaying means, and the display and check of the image and the video can be simultaneously implemented, these displays can be comparatively checked on a display screen in a visual manner.

Since welding conditions can be captured via the data logging device during playback of operation data for the welding robot, the conditions can be checked with being compared with information stored in the welding operation database.

Since the welding operation database is stored in the form of digital information, welding conditions which are usually managed in a personal manner can be transmitted to the next generation.

Hereinafter, an embodiment of the invention will be described with reference to the accompanying drawings.

Figure 1:
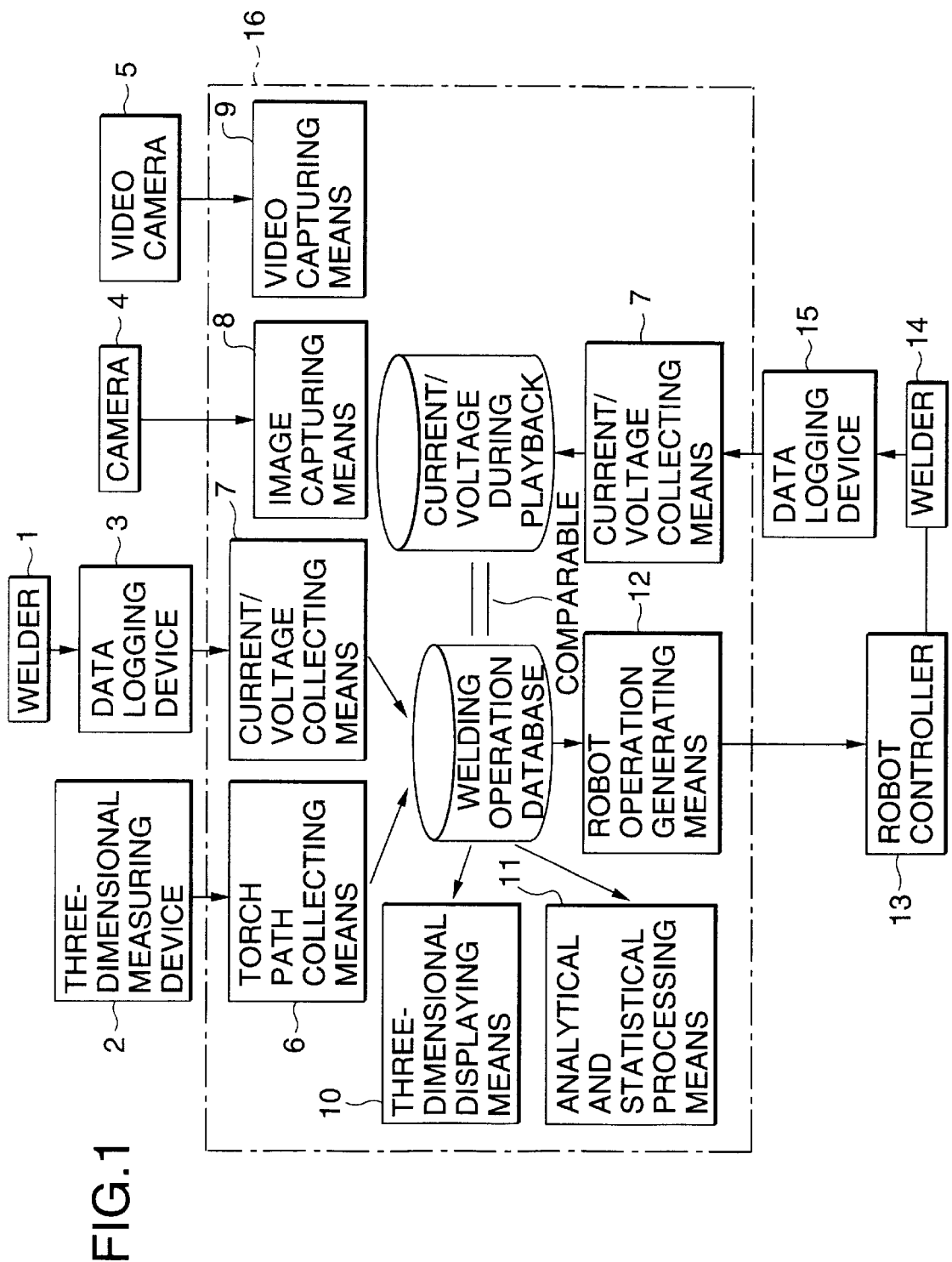
FIG. 1 is a schematic view of an apparatus and function in an embodiment of the invention.

FIG. 1 is a schematic view showing a welding robot according to an embodiment of the invention. The welding robot according to this embodiment comprises: a welder 1 which is used by a person to conduct a welding process; a three-dimensional measuring device 2 which measures a welding operation; data logging devices 3 and 15 which measure input and output currents/voltages of welders, respectively; a camera 4 which records a welding scene and a welding result in the form of an image; a video camera 5 which records a welding scene and an arc state in the form of a video; a robot 13 which reproduces a welding operation; a welder 14 which is used by the robot to conduct a welding process; torch path collecting means 6 for collecting the position and attitude of a welding torch from the three-dimensional measuring device 2; current/voltage collecting means 7 for collecting the input and output currents/voltages of the welders from the data logging devices 3 and 15; image capturing means 8 for capturing an image from the camera 4; video capturing means 9 for capturing a video from the video camera 5; three-dimensional displaying means 10 for three-dimensionally displaying data in a database on a display screen of a data management computer 16; analytical and statistical processing means 11 for performing an analytical process and a statistical process on data in the database; and robot operation generating means 12 for generating an operation of the robot on the basis of collected data of the welding operation database.

In the embodiment, the data management computer 16 captures data of the welders 1 and 14 via the data logging devices 3 and 15. When welders having a digital I/F are used, the computer can capture data without using such data logging device or directly from the welders.

The torch path collecting means 6 and the current/voltage collecting means 7 collect the torch path and the current/voltage of the welding operation which is conducted by the operator with using the welder 1, respectively. The collected data are registered to be stored in the database.

Figure 2:
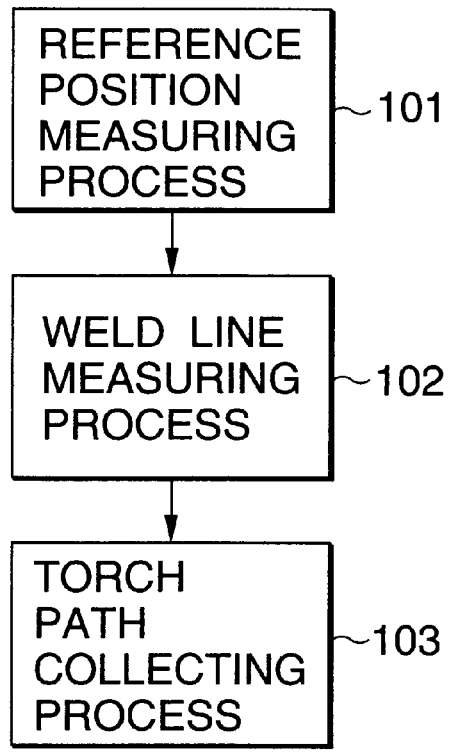
FIG. 2 is a view illustrating contents of processes in torch path collecting means in the embodiment of the invention.
Figure 3:
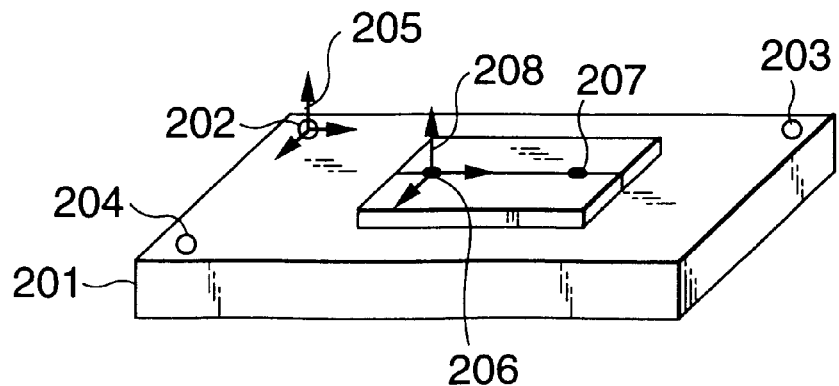
FIG. 3 is a diagram illustrating a coordinate system which is measured in a reference position measuring process in the embodiment of the invention.

FIG. 2 shows the contents of processes in the torch path collecting means 6. First, in a reference position measuring process 101, predetermined points 202 to 204 on a workbench 201 shown in FIG. 3 are measured, and reference coordinates 205 for a welding work are determined. In the collection of the torch path, the collection process is performed while recognizing the XY plane of the measured reference position coordinates 205 as the horizontal plane of the real world. Therefore, the workbench 201 must be provided with an adjusting mechanism which can maintain the workbench to be horizontal.

When the three-dimensional measuring device can be placed so as to be horizontal in the real world, it is not required to provide the workbench 201 with an adjusting mechanism which can maintain the workbench to be horizontal.

Next, in a weld line measuring process 102, the start point 206 and the end point 207 of a weld line of a welding object shown in FIG. 3 are measured, and weld line coordinates 208 serving as a reference of the collection of the torch path are determined. The coordinate system of the weld line coordinates 208 is identical with that of the reference coordinates 205, and uses the welding start point 206 as the original.

According to this configuration, the collected torch path can be always converted into data with respect to the original. In processes of the data collection, such as the three-dimensional display, and the analytical and statistical processes, the data of the torch path can be easily handled.

In a torch path collecting process 103, the torch path of the welding operation is collected, and the position and attitude of the torch which are expressed in the weld line coordinates 208 are stored.

When the torch path collecting process 103 is repeatedly implemented, the collection can be performed also on a multi-layer welding operation.

The three-dimensional displaying means 10 enables the path data and current/voltage data which are registered and stored in the database, to be visually checked on the display screen of the data management computer 16.

Figure 4:
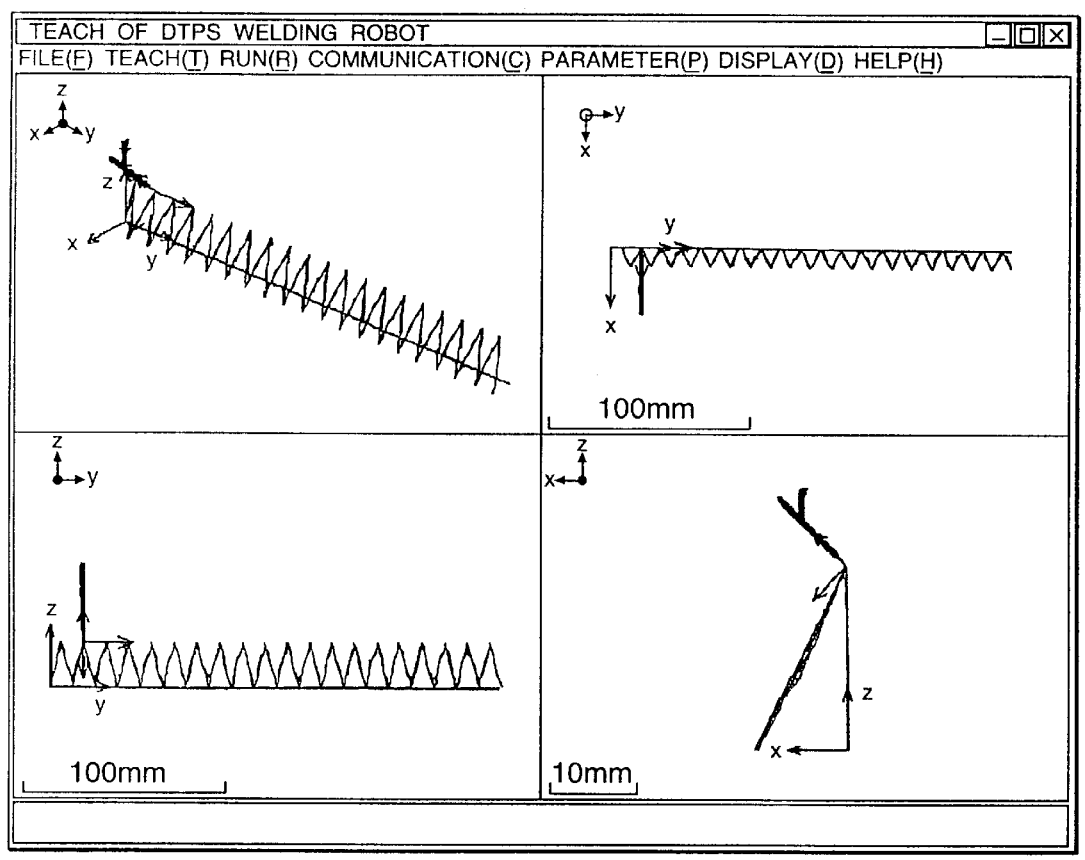
FIG. 4 is a view showing a three-dimensional display of a torch path in the embodiment of the invention.

FIG. 4 shows an image of the three-dimensional display. The torch path of the three-dimensional display shown on the display screen of the data management computer 16 can be expanded, reduced, or rotated and checked in any direction.

The analytical and statistical processing means 11 performs numerical processes, so that the welding event can be digitally analyzed.

The robot operation generating means 12 can convert the torch path and the current/voltage data into an operation of the rot-hot, thereby enabling the welding operation to be reproduced.

During reproduction of the welding operation conducted by the robot, the current/voltage collecting means 7 can measure and collect the input and output currents/voltages of the welder 14 and the collected data can be compared with the contents of the welding operation database.

The image capturing means 8 captures image data from the camera into the data management computer.

The captured image can be used for checking the situation of the welding workpiece, the welding scene, a result of the welding, etc.

The image capturing means 8 may be realized by, for example, a function which is incorporated in a utility of a digital camera or a graphic software to read an image from a scanner.

The video capturing means 9 captures video data from the video camera into the data management computer.

The captured video is temporally synchronized with the three-dimensional display of the path data and the current/voltage data, so that the video can be used in analyzation of relationships between the welding operation and the arc state.

The video capturing means 9 may be realized by a function of, for example, a utility of a digital video camera which is used for connecting the camera to a computer, or that of a video captured board.

As was described above, according to the invention, a person who cannot prepare operation data by directly operating a welding robot is enabled to prepare operation data of the welding robot by conducting a welding operation.

Furthermore, welding events which are hardly analyzed in a clear manner in the prior art can be organized into a database, so that a welding operation can be analyzed visually and numerically.

As a result, when digitized welding events are analyzed in detail and the reproduction of a welding operation by the robot is repeated, an welding operation conducted by a person skilled in welding can be subjected to analysis or the like.

Moreover, welding conditions which tend to be handled as personal know-hows can be organized into a database, and hence the invention is useful also in solving the problem in that the number of persons skilled in welding is being reduced.

What is claimed is:

1. A welding robot comprising:

a welder that is used for a welding operation;

means for monitoring the welding operation;

a welding operation database in which at least one of a welding current and a welding voltage during said monitored welding operation is accumulated as welding conditions;

robot operation generating means for receiving welding conditions corresponding to objective welding from said welding operation database, and for deciding an operation of said robot;

a robot controller which drivingly controls said robot in accordance with an output of said robot operation generating means; and a welder which is controlled in accordance with the welding conditions output from said welding operation database.

2. A welding robot according to claim 1, wherein said monitoring means includes a welder torch path collecting means, and wherein, during said monitored welding operation, information from the welding torch path collecting means is accumulated, together with said at least one of the welding current and the welding voltage, in said welding operation database as welding conditions.

3. A welding robot according to claim 1, wherein said monitoring means includes an image capturing means, and wherein, during said monitored welding operation, welding image information from the image capturing means is accumulated, together with said at least one of the welding current and the welding voltage, in said welding operation database as welding conditions.

4. A welding robot according to claim 1, wherein said monitoring means includes a video capturing means, and wherein, during said monitored welding operation, welding video information from the video capturing means is accumulated, together with said at least one of the welding current and the welding voltage, in said welding operation database as welding conditions.

5. A welding robot according to claim 1, wherein said monitoring means includes a data logging device, and wherein, during said monitored welding operation, said at least one of the welding current and the welding voltage is accumulated, via the data logging device, in said welding operation database as welding conditions.

6. A welding robot according to claim 1, wherein said robot further comprises analytical and statistical processing means for linking said welding operation database with data.

7. A welding robot according to claim 1, wherein said robot further comprises: three-dimensional displaying means for choosing plural welding conditions corresponding to objective welding from said welding operation database, and for displaying a welding state corresponding to the chosen welding conditions; and selecting means for selecting the chosen welding conditions.

8. A welding robot according to claim 1, wherein said robot further comprises: collecting means for collecting said at least one of the welding current and the welding voltage as welding conditions during playback; and comparing means for comparing the collected welding conditions with the welding conditions which are selected from said welding operation database.

9. A welding robot according to claim 8, wherein said robot further comprises: a robot controller which controls said robot; a welder which communicates with said robot controller and which controls said at least one of the welding current and the welding voltage; a data logging device which detects a state of said at least one of the welding current and the welding voltage that are output from said welder; current/voltage collecting means for accumulating, in said data base, a signal output from said data logging device; and comparing means for comparing the accumulated data with corresponding data in said welding operation database, control data of said welder being corrected on the basis of a result of the comparison.

* * * * *